United States Patent [19]
Shanbaum et al.

[11] Patent Number: 6,011,630
[45] Date of Patent: Jan. 4, 2000

[54] SYSTEM AND METHOD FOR BLOCKING A LENS

[75] Inventors: Robert M. Shanbaum, Glastonbury; David C. Finegan, Manchester, both of Conn.

[73] Assignee: Gerber Optical, Inc., South Windsor, Conn.

[21] Appl. No.: 08/746,459

[22] Filed: Nov. 12, 1996

[51] Int. Cl.$^7$ .............................. G01B 11/00; G01B 9/00; G02B 7/02

[52] U.S. Cl. ......................... 356/401; 356/127; 359/818; 359/819; 164/334; 451/5; 29/527.3

[58] Field of Search ..................................... 356/399–401, 356/127, 124; 359/818–819, 809, 798; 164/334; 451/5–6, 42, 65; 29/527.3

[56] References Cited

U.S. PATENT DOCUMENTS

| | | |
|---|---|---|
| 3,015,196 | 1/1962 | Campbell . |
| 3,134,208 | 5/1964 | Richmond . |
| 3,321,870 | 5/1967 | Bolden . |
| 3,586,448 | 6/1971 | Beasse . |
| 3,828,842 | 8/1974 | Tagnon . |
| 4,319,846 | 3/1982 | Henry et al. . |
| 4,330,203 | 5/1982 | Oppenheim et al. ................... 356/127 |
| 5,283,980 | 2/1994 | Lohrenz et al. ..................... 51/165.72 |
| 5,408,792 | 4/1995 | Gottschald . |
| 5,421,771 | 6/1995 | Wardle . |
| 5,425,665 | 6/1995 | Kennedy . |
| 5,505,654 | 4/1996 | Wood et al. . |
| 5,588,899 | 12/1996 | Gottschald ................................. 451/5 |

FOREIGN PATENT DOCUMENTS

| | | |
|---|---|---|
| 0274921A1 | 7/1988 | European Pat. Off. . |
| 0415813 | 3/1991 | European Pat. Off. . |
| 0615814A1 | 9/1994 | European Pat. Off. . |
| 0652077A1 | 5/1995 | European Pat. Off. . |
| 2518923 | 7/1983 | France . |
| 392 4078 | 1/1991 | Germany . |
| 400 3002 | 5/1991 | Germany . |
| 1165549 | 1/1966 | United Kingdom . |
| 1126599 | 9/1968 | United Kingdom . |
| 1172090 | 11/1969 | United Kingdom . |
| 1321543 | 6/1973 | United Kingdom . |
| 1391872 | 4/1975 | United Kingdom . |
| 1391880 | 4/1975 | United Kingdom . |
| 2055642 | 3/1981 | United Kingdom . |

*Primary Examiner*—Frank G. Font
*Assistant Examiner*—Jason D. Vierra-Eisenberg
*Attorney, Agent, or Firm*—McCormick, Paulding & Huber

[57] ABSTRACT

The invention relates to an apparatus and method for applying a finishing block to a lens. The apparatus displays an alignment pattern representing characteristics of the lens and includes a visual representation of the allowable tolerance in the position of the optical center of the lens and the prism of the lens. An imaging screen is provided for imaging the alignment pattern and reference data applied to a surface of the lens. The lens is positioned in the apparatus with the pattern and the data aligned. With the lens in this position, a determination is made using the visual representation as to whether the lens is within the allowable tolerance. If this is the case, the apparatus automatically attaches the finishing block to the lens in registration with the reference data.

5 Claims, 9 Drawing Sheets

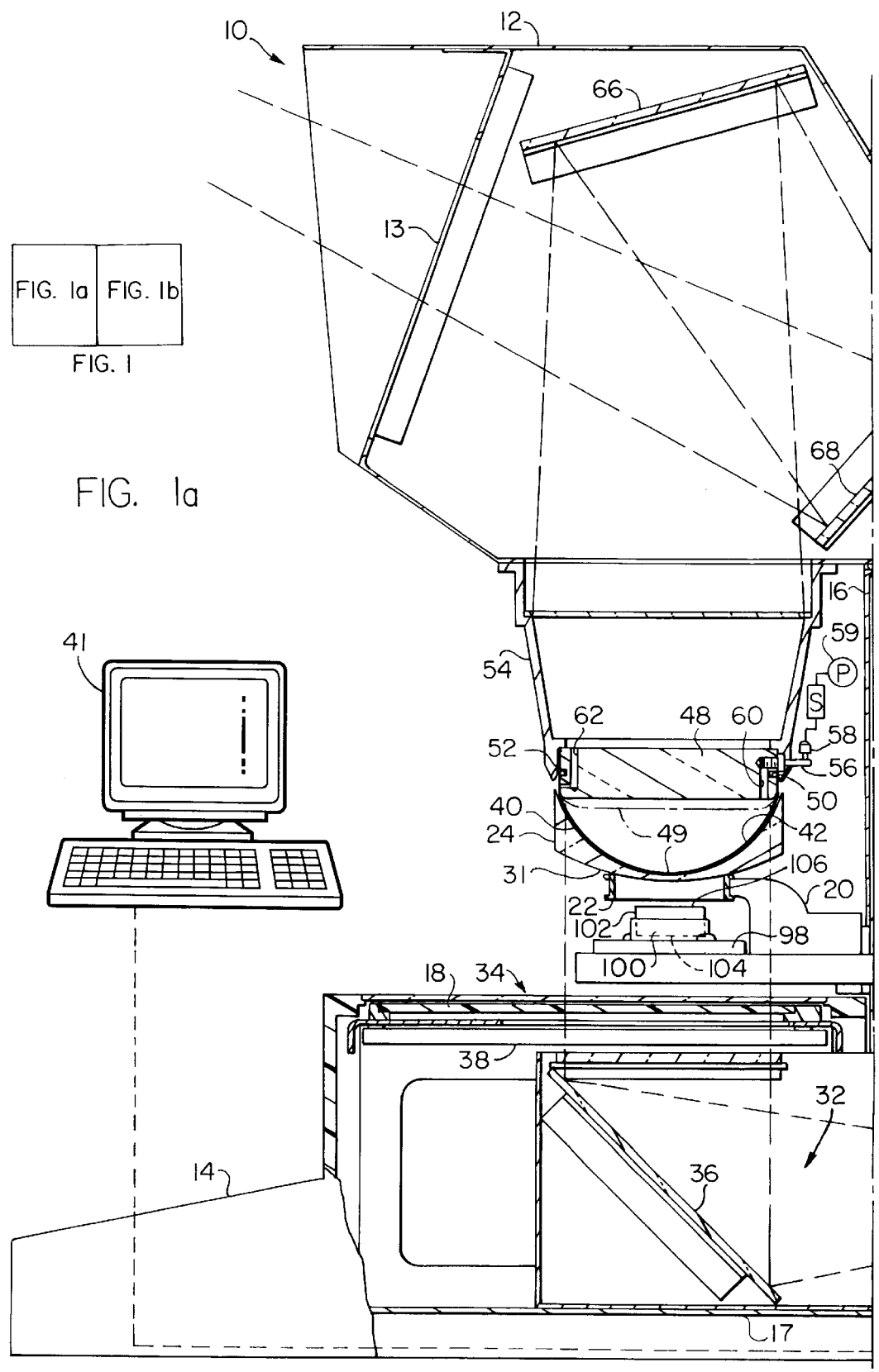

| | |
|---|---|
| Sphere | -1 |
| Cyl. Add | 0 |
| Cyl. Axis | 0 |
| Hor. Tol. | 0.67 |
| Ver. Tol. | 0.33 |
| Max. mm | 10 |
| Min. mm | 1 |
| Hor. Pwr. | -1 |
| Ver. Pwr. | -1 |

| | Xmax | Ymax |
|---|---|---|
| | 6.7 | 3.3 |

| X | Y |
|---|---|
| 6.7 | 0 |
| 6.7 | 3.3 |
| 0 | 3.3 |
| -6.7 | 3.3 |
| -6.7 | 0 |
| -6.7 | -3.3 |
| 0 | -3.3 |
| 6.7 | -3.3 |
| 6.7 | 0 |

```
Sphere        -1
Cyl. Add      -1
Cyl. Axis      0

Hor. Tol.    0.67
Ver. Tol.    0.33

Max. mm       10
Min. mm        1

Hor. Pwr.     -1
Ver. Pwr.     -2

Xmax   Ymax
            6.7   1.65

X      Y
      6.7     0
      6.7    1.65
       0     1.65
     -6.7    1.65
     -6.7     0
     -6.7   -1.65
       0    -1.65
      6.7   -1.65
      6.7     0
```

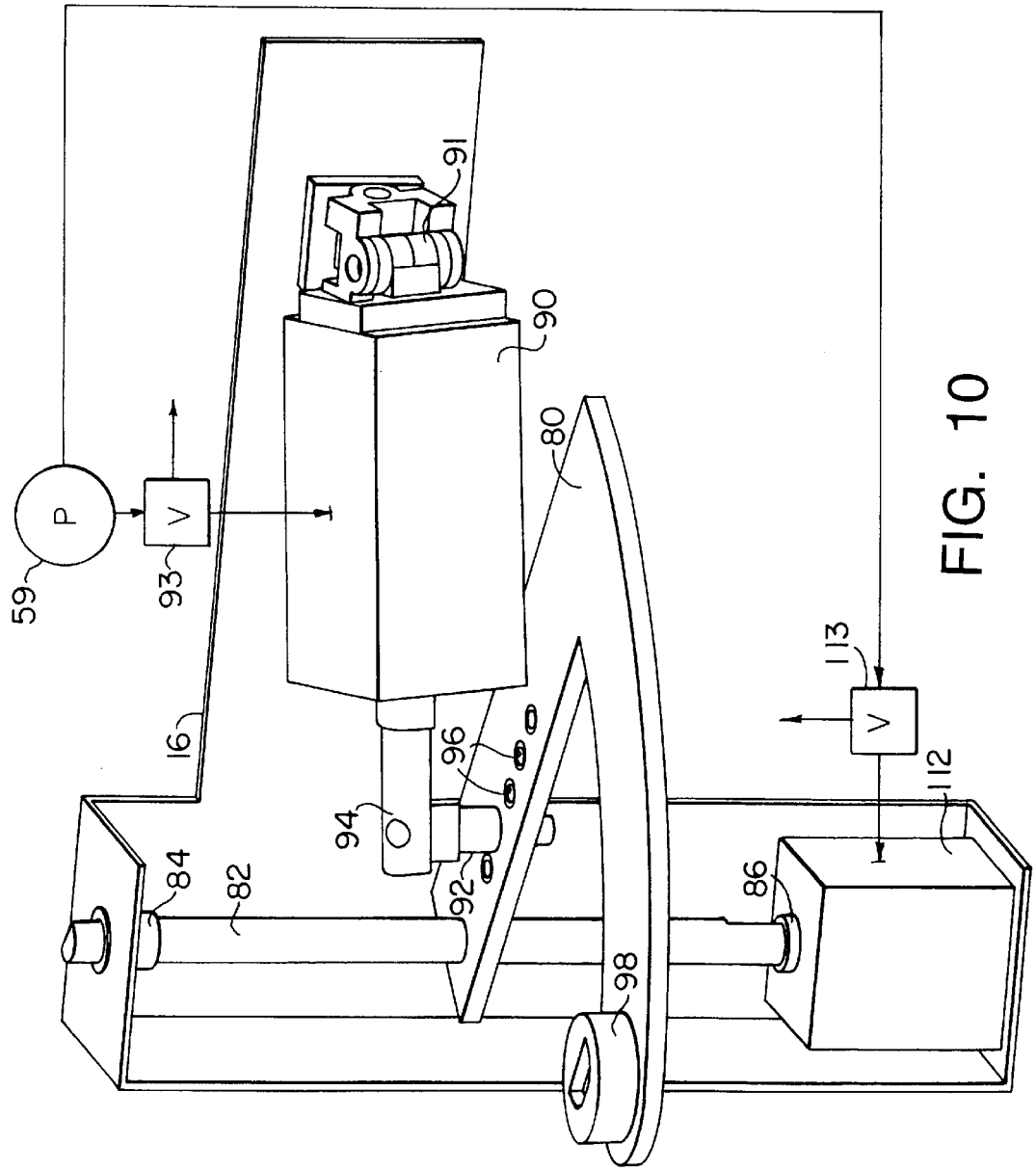

SYSTEM AND METHOD FOR BLOCKING A LENS

BACKGROUND OF THE INVENTION

The present invention relates generally to an apparatus and method for applying a finishing block to a lens, such as an eyeglass lens, in registration with reference data on the lens. More particularly, the invention relates to such an apparatus and method wherein an alignment pattern is provided which includes a visual representation of acceptable tolerances in the position of the optical center of the lens and the amount of prism in the lens.

Commonly assigned patent application Ser. No. 08/718,153, filed on Sep. 24, 1996 and herein incorporated by reference, discloses an apparatus for attaching a finishing block to a lens in registration with reference data present on one surface of the lens. The reference data may take the form of markings applied to the lens indicating, for example, the optical center and the 0–180° axis of the lens. The reference data may also include physical structure such as a bifocal segment defined by the surface of the lens.

The apparatus includes a display for projecting an alignment pattern representing characteristics of the lens along an image path. An operator places the lens in the apparatus with the reference data on the lens aligned with the corresponding characteristics of the lens represented in the pattern. When the operator has positioned the lens in the apparatus with the reference data properly aligned with the pattern, the apparatus will automatically attach the finishing block at the correct location on the lens. Once the finishing block is attached, the lens is placed in an edging device for further processing.

Alignment of the reference data on the lens with the pattern does not provide any indication as to whether the optical center of the lens is properly located or whether the lens has the required prism. In the case of an eyeglass lens, for example, the ophthalmologist or optometrist cannot determine if the lens conforms to the specified prescription until the lens is finished, inserted into an eyeglass frame and fitted to the patent.

SUMMARY OF THE INVENTION

The present invention provides an apparatus for automated attachment of a finishing block to a lens in registration with reference data present on one surface of the lens. The apparatus includes a display for projecting an alignment pattern representing optical characteristics of the lens along an image path. In accordance with the invention, the alignment pattern further provides the operator with a visual representation of acceptable tolerances in the position of the optical center of the lens and the prism of the lens. The parameters and associated formulas for calculating these tolerances will be described below.

The apparatus further includes an imaging screen for imaging the alignment pattern and the referenced data on the lens. Using the imaging screen, the operator aligns the reference data with the alignment pattern projected by the apparatus. The operator can then determine whether the optical center of the lens has been properly positioned and if the lens has the required prism.

The apparatus further includes a block support for attaching the finishing block to the surface of the lens including the reference data. Once the lens is aligned, the apparatus automatically attaches the block to the lens in registration with the reference data provided.

In the preferred embodiment of the invention, the alignment pattern includes a box, the perimeter of which represents the acceptable tolerance in the optical center of the lens. If, when the operator aligns the pattern with the reference data on the lens, the optical center of the lens falls within the box, the optical center has been properly positioned and the lens has the correct prism.

In a second aspect, the invention provides a method for attaching a finishing block to a lens having reference data present on one surface. The method includes the steps of projecting an alignment pattern representing optical characteristics of the lens and depicting tolerances in the position of the optical center of the lens and the prism of the lens. The alignment pattern and the reference data are imaged on a screen, and the lens is positioned with the reference data aligned with the alignment pattern. Once the pattern and the reference data are aligned, a determination is made as to whether the optical center of the lens is properly positioned and, accordingly, whether the lens has the correct prism. If this is the case, the finishing block is attached to the lens in registration with the reference data.

BRIEF DESCRIPTION OF THE DRAWINGS

FIG. 10 is a perspective view of the block support mechanism for pivoting the support arm and raising and lowering the support arm to attach a finishing block to the lens.

DETAILED DESCRIPTION OF THE INVENTION

Figure 1B:
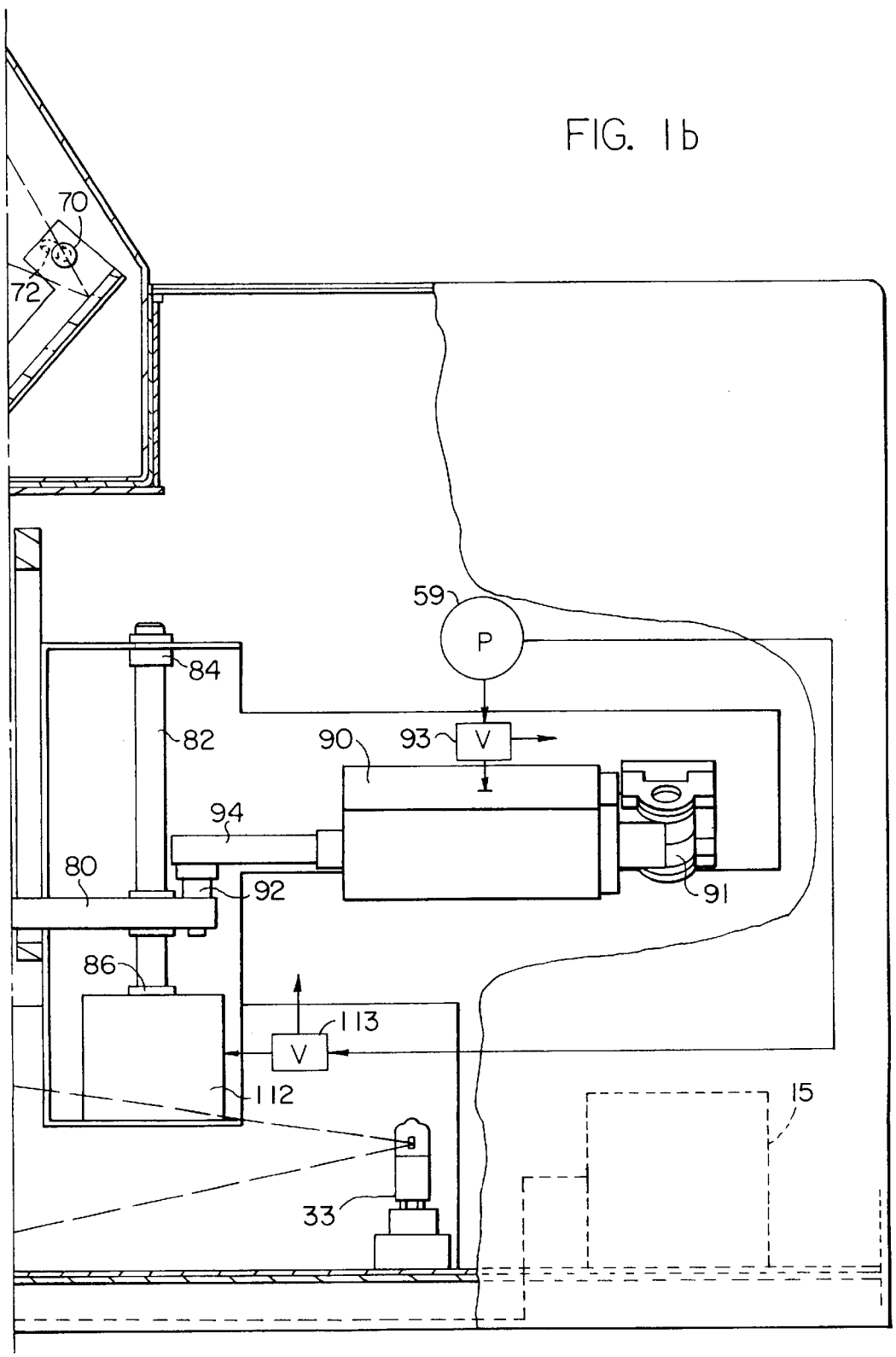
FIG. 1 is a side elevation of an apparatus embodying the invention.

FIG. 1 illustrates an apparatus embodying the invention for attaching a finishing block to a lens. The apparatus, generally designated 10, is compact and portable and can be placed on a table, work bench or other support and operated by a user while sitting. The apparatus 10 includes a housing 12 which encloses the operative components of the apparatus and defines a viewing port 13 which opens to the front of the apparatus. A user interface in the form of a keypad 14 is provided, through which the user can selectively control various functions of the apparatus. The functions performed by the apparatus are directed by a central controller 15 which comprises an I/O board and a CPU board.

As shown in FIG. 1, the apparatus 10 further includes a frame 16 enclosed within the housing 12 and supported on a base 17. A display screen 18 and a lens support bracket 20 are mounted on the frame 16. The support bracket 20 includes an integral lens support ring 22 for supporting a lens 24 to which the finishing block will be attached.

Figure 2:
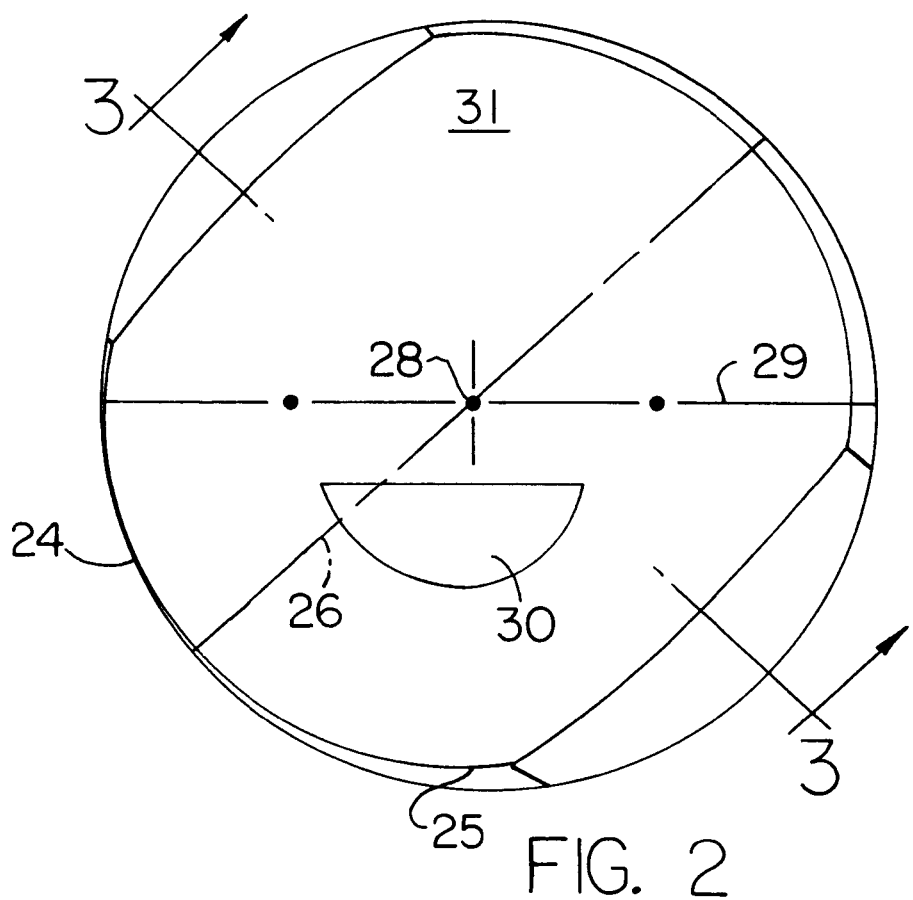
FIG. 2 is a plan view of a lens to which the finishing block will be attached.
Figure 3:
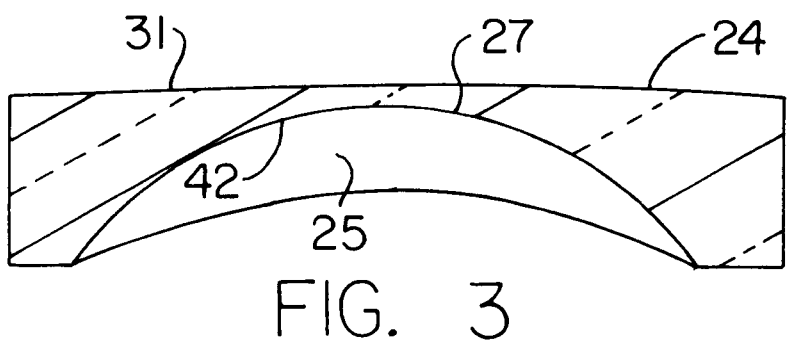
FIG. 3 is a cross section taken along the lines 3—3 in FIG. 2.

The lens is shown in greater detail in FIGS. 2 and 3. The lens includes a cylinder 25 having an axis 26 and a curvature 27 which provides the lens 24 with the cylinder power specified by the prescription. Reference data including a marking 28 indicating the optical center of the lens, a marking 29 indicating the 0–180° meridian of the lens and a bifocal segment 30 are provided on the front surface 31 of the lens, i.e., the outside surface of the lens with respect to the wearer.

An optical system, generally designated 32, which includes a light source, a plurality of mirrors and lenses, and an imaging screen is mounted on the frame 16 for presenting an alignment pattern created on the display screen 18, as well as reference data disposed on the front surface 31 of the lens 24, to the user of the apparatus at the viewing port 13. It is important to note that the front surface 31 of the lens 24 is mounted coincident with the display screen 18, i.e., there is no optical power between the display screen 18 and the front surface 31 of the lens. The lens 24 is itself an optical power; however, it occurs downstream of the position in the image path where the alignment pattern on the LCD and the reference data on the front surface of the lens are aligned. Thus, both the alignment pattern on the display screen and the reference data on the front surface of the lens are refracted together by the lens.

In the illustrated embodiment, the light source for the optical system 32 is a halogen lamp 33 supported on the base 17. The lamp projects light onto a first mirror 36 positioned in front of the lamp and disposed at an angle thereto. The mirror 36 redirects the light upwardly through a ferns collimating lens 38 and onto the display screen 113 to project an image of the alignment pattern displayed by the screen 18 onto an imaging screen 40 positioned above the lens 24 and immediately adjacent to the rear surface 42 of the lens.

Figure 4:
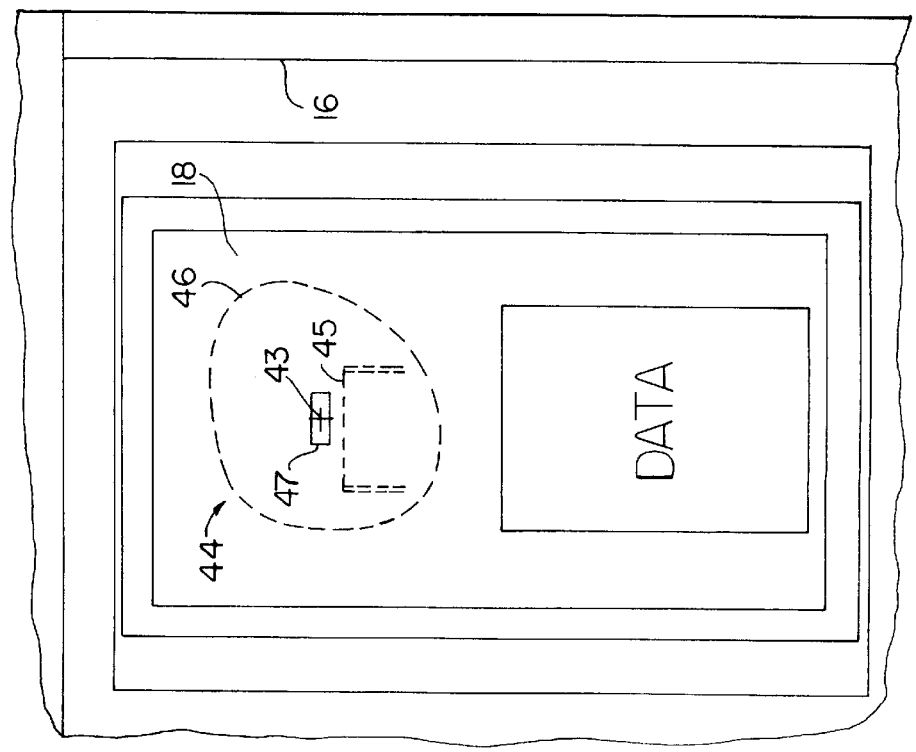
FIG. 4 is an enlarged top plan view of a display screen which forms a part of the apparatus shown in FIG. 1.

Referring now to both FIGS. 1 and 4, the apparatus 10 is linked to a layout computer (not shown) which, depending on the particular finished lens being produced, provides the display screen 18 with the appropriate alignment pattern, such as the alignment pattern 44 illustrated in FIG. 4. This can be accomplished by, for example, providing the computer with a job number which corresponds to a particular finished eyeglass lens via the keypad 14. The computer correlates the specified job number with data stored in memory defining the appropriate alignment pattern for the corresponding finished lens.

As shown in FIG. 4, the alignment pattern 44 displayed on the screen 18 may, for example, take the form of markings 43 indicating the optical center of the lens, markings 45 indicating a bifocal segment in the finished lens, as well as markings 46 indicating the periphery of the finished lens. The alignment pattern further includes a rectangular box or tolerance box 47 which provides a visual representation of the tolerance permitted in the position of the optical center 28 of the lens 24. The method for calculating the periphery of the box 47 for a particular lens and the manner in which the alignment pattern 44 is utilized to correctly block the lens 24 will be explained further below.

The lower portion of the display screen 18 is used to display textual data, such as the data representing, for example, the job number of the particular lens being blocked, the size of the bifocal segment, the sphere and cylinder powers of the lens, other prescription information regarding the finished lens, or even diagnostic information concerning various functions of the apparatus 10 which are monitored by the computer. This data is displayed on the screen 18 for viewing by the operator in the area 34 just above the keypad 14.

Figure 5:
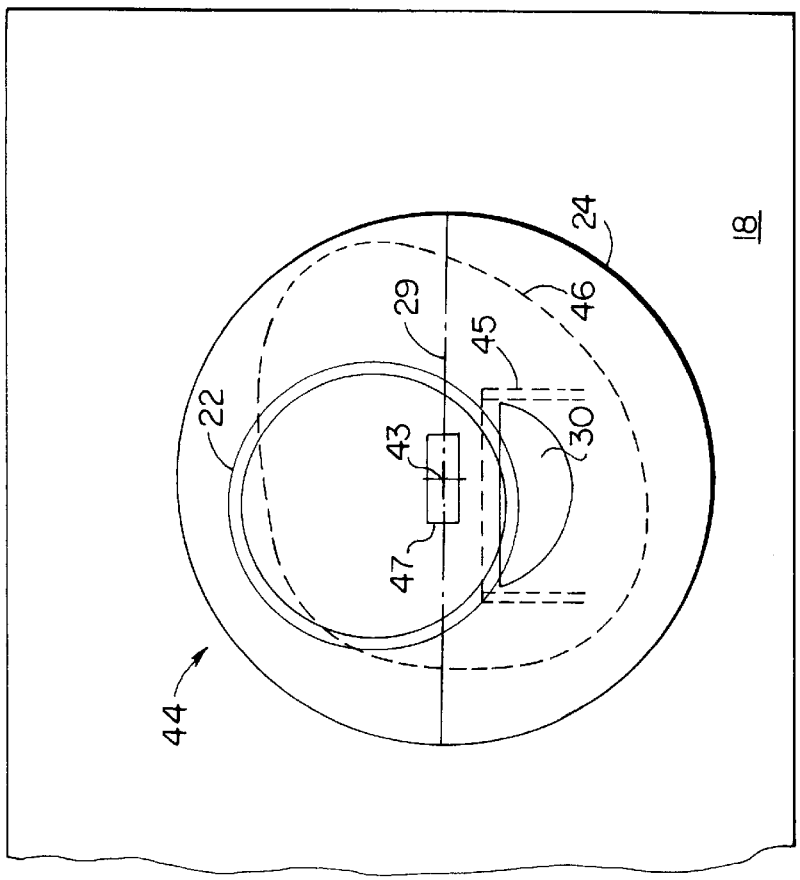
FIG. 5 is a fragmentary view of the view screen which forms a part of the apparatus shown in FIG. 1.

Referring now to FIGS. 1 and 5, the screen 18 is a liquid crystal display (LCD) with standard computer-generated graphics capabilities of the type commonly found in lap top computers. For the purposes of the present invention, the display is modified to remove the back lighting in the upper portion of the screen 18, i.e., the portion where the alignment pattern is displayed, so that this portion of the display is translucent. Thus, light directed by the collimating lens 38 passes directly through the display screen 18 to project a shadow image of the alignment pattern 44 onto the imaging screen 40. While a broad range of standard LCDs modified to remove the back lighting are suitable for use in the present invention, a passive matrix EG series LCD available from OPTREX is preferred.

The imaging screen 40 is mounted on a screen support 48 positioned on the frame 16 directly above the support ring 22. The imaging screen 40 is formed from a translucent elastomeric membrane which defines a diaphragm 49 inflatable between a first position (shown in broken lines in FIG. 1) displaced from the rear surface 42 of the lens and a second position (shown in full line in FIG. 1) immediately adjacent to and in contact with the rear surface 42 of the lens 24. In the preferred embodiment of the invention, a latex membrane defines the diaphragm 49, although other translucent elastomeric membranes may be used to form the diaphragm.

The diaphragm 49 includes a resilient rim 50 which forms a snap engagement with a correspondingly sized groove 52 defined by the screen support 48. A retaining clamp 54 mounted on the screen support 48 secures the rim of the diaphragm within the groove 52 and seals the diaphragm to the screen support. An air inlet 56 having a solenoid actuated pneumatic valve 58 is connected to an air compressor or pump 59 and to a channel 60 formed in the screen support 48. By entering the operative command at the keypad 14, the operator causes the valve 58 to open and the apparatus automatically inflates the diaphragm to position the imaging screen adjacent to the rear surface 42 of the lens 24.

As the diaphragm inflates to the desired level, the pressure within the diaphragm builds to a point after which air bleeds through a relief orifice 62 provided in the screen support 48. That is, the orifice 62 is dimensioned to prevent over inflation of the diaphragm while allowing the diaphragm to inflate sufficiently to position the imaging screen adjacent the rear surface of the lens. It should also be understood that when the diaphragm 49 is inflated and the imaging screen is in contact with the rear surface of the lens, the position of the lens 24 on the support ring 22 can be manually adjusted or aligned.

Continuing now with the description of the optical system, light passing through the translucent imaging screen 40 strikes a second mirror 66 mounted in a fixed position on the frame 16 at the top of the housing 12. Thus, the image created on the imaging screen 40 is projected onto the mirror 66 and is then reflected from this mirror to a third mirror 68. Finally, the image is reflected from the mirror 68 to the view port 13. As shown in FIG. 1, the mirror 68 is adjustably mounted by a pin 70 in a slot 72 formed in the frame 16. Thus, by adjusting the position of the mirror 68 with respect to the frame 16, the position of the image in the view port can be adjusted for operators of differing height.

FIG. 5 illustrates what the operator sees through the view port 13 when utilizing the apparatus 10 to properly align the lens 24 for blocking. With the diaphragm 49 inflated so that the imaging screen 40 is positioned adjacent to the rear surface 42 of the lens, the screen 40 projects an image of the alignment pattern 44 provided by the display screen 18, an image of the lens 24 supported on the support ring 22, and the reference data applied to the lens which, in the illustrated embodiment, comprises the bifocal segment 30 on the front surface 31 of the lens, the optical center marking 28 and the 0–180° meridian 29.

The operator positions the lens 24 on the support ring 22 so that the bifocal segment 30 aligns with the bifocal markings 45 displayed on the LCD 18. The operator also confirms that the lens periphery markings 46 displayed on the LCD fall within the confines of the lens 24. That is, the operator confirms that the lens 24 is large enough to encompass the periphery of the finished eyeglass lens. In addition, the operator confirms that the marking 28 indicating the optical center of the lens 24 falls within the periphery of the tolerance box 47. If this is not the case, the optical center of the lens is displaced from the required position by a distance which exceeds the acceptable tolerance. As a consequence, the error in the prism of the lens will also exceed the acceptable tolerance. Where these conditions pertain, the lens 24 will have to be discarded and a new lens prepared.

It should be understood that if the optical center marking 28 falls within the periphery of the box 47 but the periphery 46 of the finished eyeglass lens is not encompassed by the lens 24, the lens 24 may be repositioned so as to include the entire periphery marking 46. However, there is a limit to the degree of repositioning which is permitted. The lens 24 cannot be reposition to the extent that the optical center marking 28 falls outside the tolerance box 47. If this degree of repositioning is required to fit the periphery 46 of the finished lens within the lens 24, then the lens 24 must be discarded and a new lens prepared.

The tolerances in the position of the optical center and the prism of the lens are (calculated based on the following parameters which are either entered by the operator using the keypad 14 or downloaded from the host computer with other data pertaining to the lens 24:

Sphere: Sphere power of the lens in diopters.

Cyl. Add: Additional cylinder power of the lens. The curvature of the lens cylinder. E.g., the curvature 27 of the cylinder 25. This is 0 for a spheric lens.

Cyl. Axis: The axis of the cylinder with respect to the 0–180° meridian. E.g., the axis 26 of the cylinder 25 with respect to the 0–180° meridian 29. This parameter is not used for a spheric lens.

Hor. Tol: Horizontal prism tolerance. This is a per-selected parameter to describe the allowable prism tolerance in diopters along the 180° meridian 29.

Ver. Tol: Vertical prism tolerance. This is a per-selected parameter to describe the allowable prism tolerance in diopters along the 90° meridian.

Max. mm: Maximum millimeters of decentration. This is a pre-selected parameter which describes the allowable number of millimeters the lens may be moved away from the target position 43 either horizontally or vertically. If the maximum number of millimeters calculated based on the prism tolerance is larger than Max. mm, it is replaced by Max. mm.

Min. mm: Minimum millimeters of decentration. This is a pre-selected parameter which describes the number of millimeters the lens may be moved away from the target position 43 either horizontally or vertically that is always allowable no matter what amount of prism is caused by this decentration.

Hor. Pwr: Horizontal power. This is the power of the lens in the 0–180° meridian and is calculated using the following formula:

$$\text{Hor. pwr.} = \text{sphere pwr.} + (\text{cyl. pwr.} \times \sin^2(\text{cylinder axis}))$$

Ver. Pwr: Vertical power. This is the power of the lens in the 90° meridian and is calculated using the following formula:

$$\text{Ver. pwr.} = \text{sphere pwr.} + (\text{cyl. pwr.} \times \cos^2(\text{cylinder axis}))$$

Xmm: ± millimeters of prism allowed along the 180° meridian which is calculated using the following formula:

$$X\text{mm} = \frac{\text{Horizontal prism tolerance} \times 10}{\text{Horizontal power}}$$

Y mm: ± millimeters of prism allowed along the 90° meridian which is calculated using the following formula:

$$Y\text{mm} = \frac{\text{Vertical prism tolerance} \times 10}{\text{Vertical power}}$$

XY: These are the (X,Y) coordinates in millimeters that describe the tolerance box 47.

Using the above-described parameters and formulas, the tolerance box is calculated according to the following procedure:

Hor. Tol., Ver. Tol., Max. mm, and Min. mm are selected by the operator and entered via the keypad 14.

Sphere, Cyl. Add., and Cyl. Axis are provided for the stored data corresponding to the particular lens being formed or are entered by the operator.

Hor. Pwr. is calculated using the formula for power of the lens in the 0–180° meridian based on the values for Sphere, Cyl. Add. and Cyl. Axis.

Ver. Pwr. is calculated using the formula for power of the lens in the 90° meridian based on the values for Sphere, Cyl. Add. and Cyl. Axis.

X mm is calculated using the X mm formula and the values for Hor. Tol. and Hor. Pwr.

Y mm is calculated using the Y mm formula and the values for Ver. Tol. and Ver. Pwr.

The tolerance box is drawn with a width of 2·X mm (X mm on each side of the optical center) and a height of 2·Y mm (Y mm above and below the optical center). The tolerance box is centered on the position of the optical center which, as noted previously with respect to the target position 43, is provided by the layout computer or entered by the operator.

The procedure may be used with a lens having sphere power only, a lens with both sphere and cylinder power, or a lens with cylinder power only.

Figure 6:
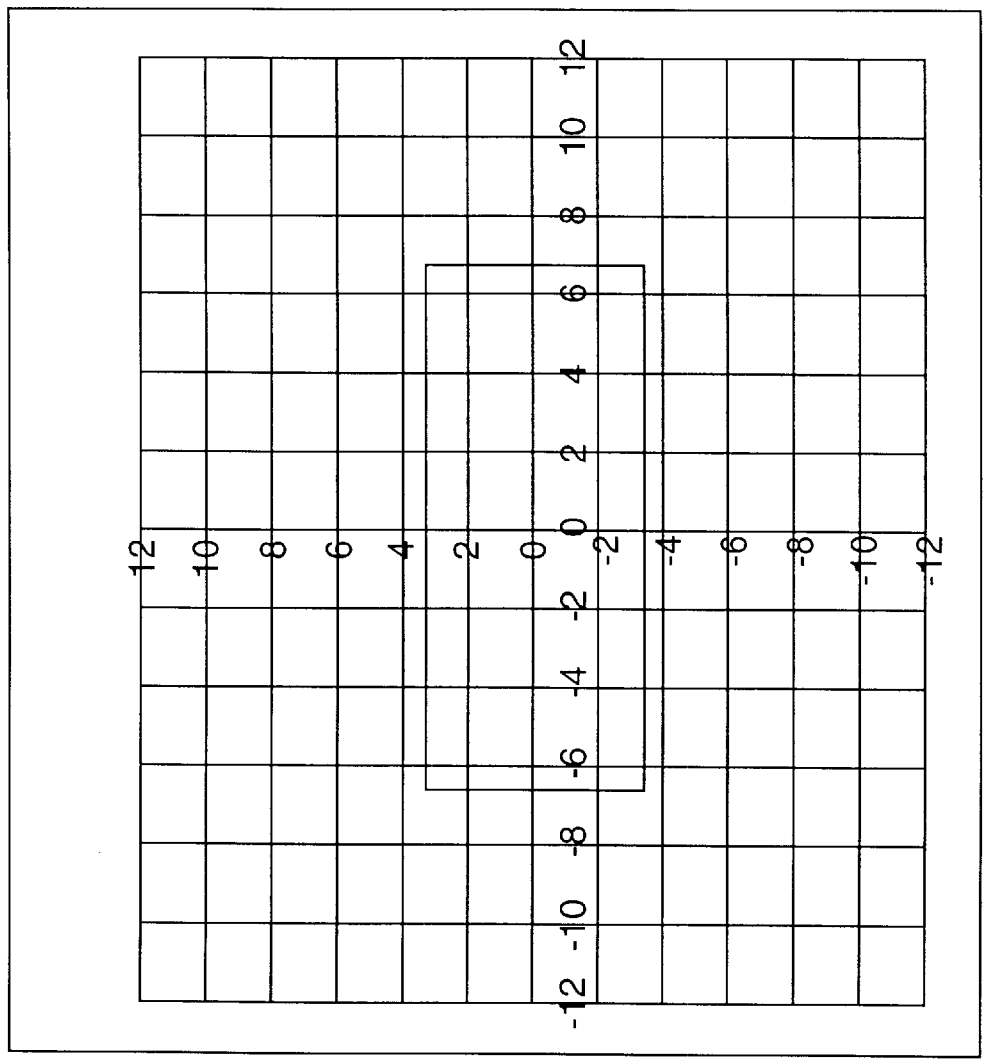
FIG. 6 shows a graphical illustration of a −1 diopter spherical lens.
Figure 7:
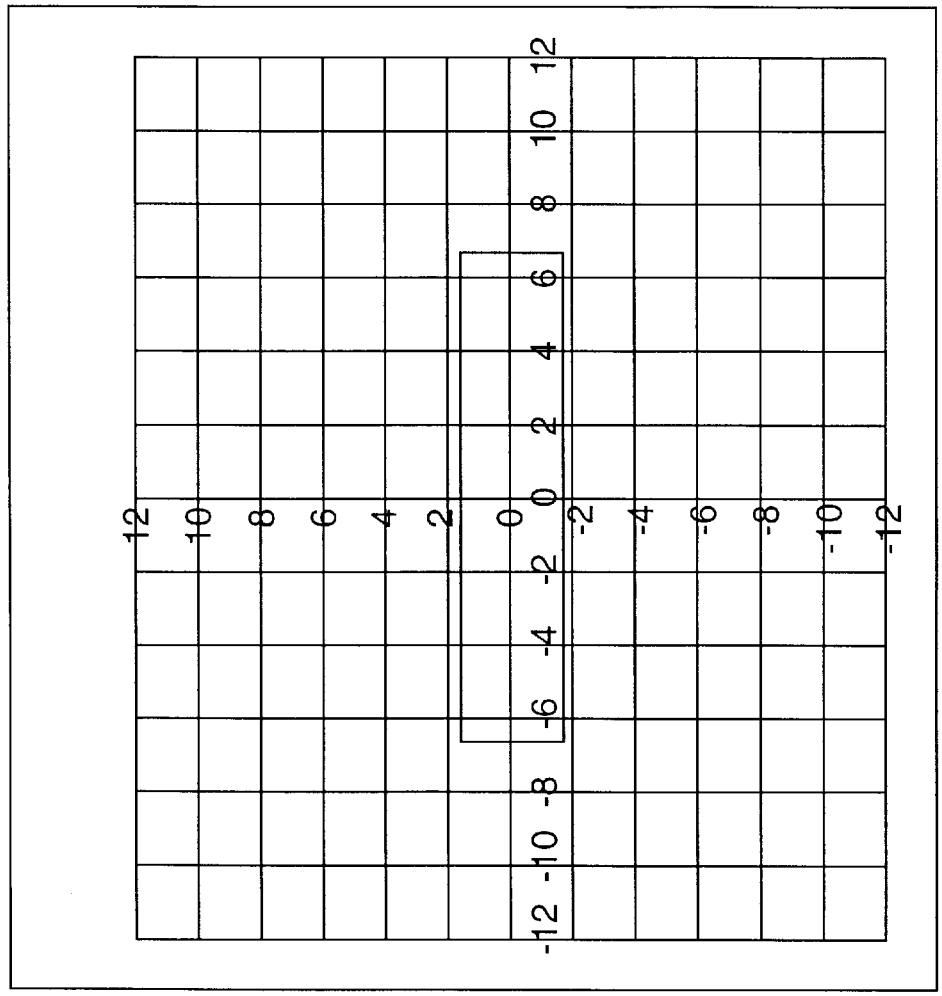
FIG. 7 shows a graphical illustration of a sphero-cylinder lens with a −1 diopter sphere and a −1 diopter cylinder.
Figure 8:
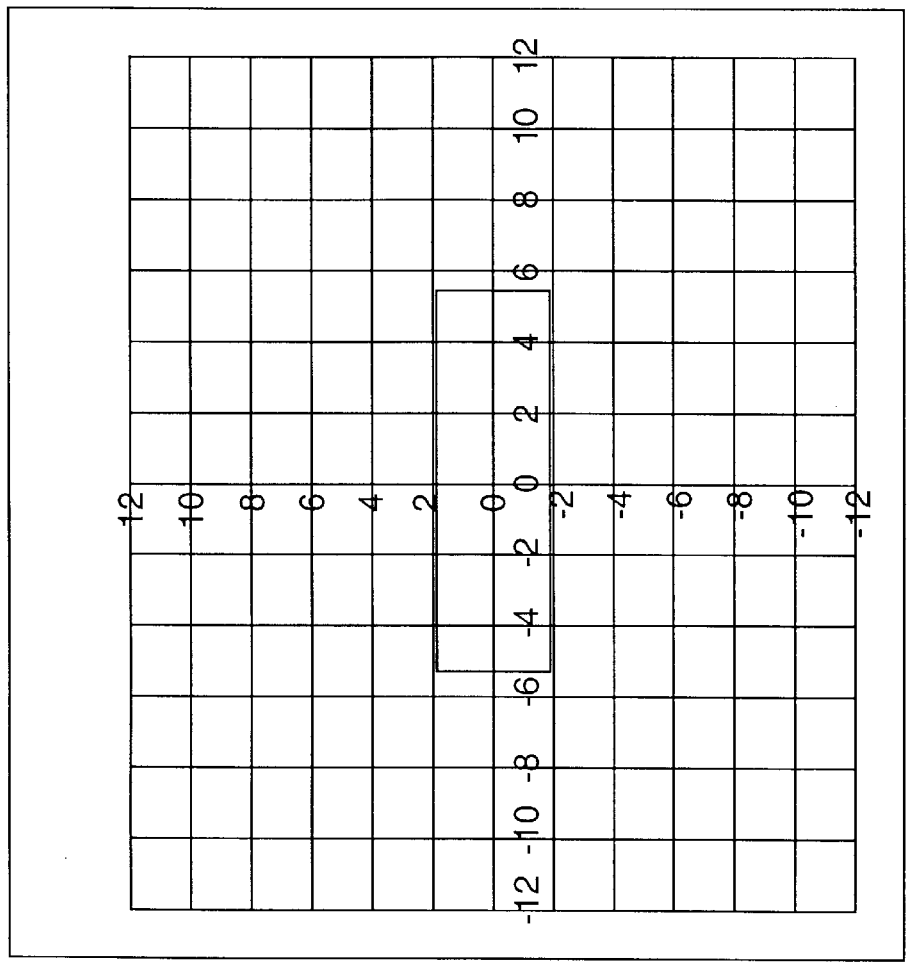
FIG. 8 shows a graphical illustration of a sphero-cylinder lens with a −1 diopter sphere and a −1 diopter cylinder but with the cylinder axis at 30°.

Three examples illustrating the tolerance box calculated for three different lenses using the above parameters and formulas are illustrated in FIGS. 6, 7 and 8. Each example uses a horizontal prism tolerance of 0.67 diopters and a vertical tolerance of 0.33 diopters.

As shown in FIG. 6, this example illustrates a −1 diopter spherical lens. The lens will be in tolerance if the optical center falls anywhere within the 13.4 mm×6.6 mm tolerance box that is illustrated.

As shown in FIG. 7, this example shows a sphero-cylinder lens with a −1 diopter sphere and a −1 diopter cylinder. The cylinder axis is 0°. The illustrated tolerance box is the same width as the box in the first example but has a shorter height. This is the case because the power in the 0–180° meridian is the same as in the first example, but the power in the 90° meridian is stronger. This is shown by the Hor. Pwr. and Ver. Pwr. values.

Referring to FIG. 8, this example relates to a lens similar to that in Example 2 but with the cylinder axis at 30°. This changes the dimensions of the tolerance box since the Hor. Pwr. and Ver. Pwr. values have changed.

Figure 9:
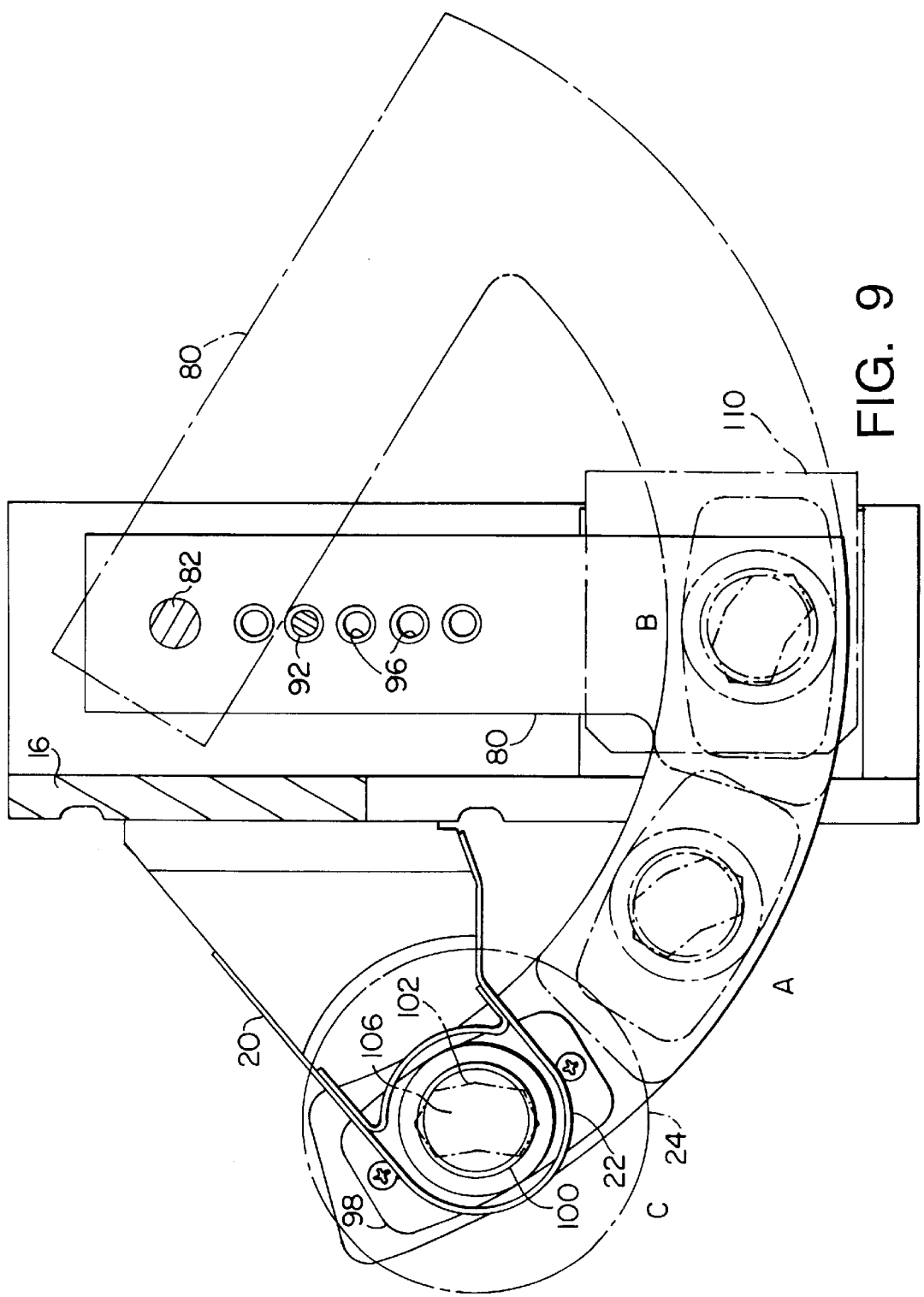
FIG. 9 is a fragmentary top view of the movable support arm which forms a part of apparatus shown in FIG. 1.

Returning now to a description of the apparatus 10, once the lens 24 has been properly aligned and it has been determined that the lens is within tolerance, it is clamped into position on the support ring 22 and the blocking operation proceeds. Referring now to FIGS. 1 and 9, the apparatus 10 includes a pivot arm 80 mounted to a shaft 82 rotatably supported in bearings 84 and 86. The pivot arm 80 is coupled to a pneumatic piston/cylinder assembly 90 mounted on the frame 16 by ball joint 91. A shoulder screw 92 extending from ball joint 94 is received in one of a series of holes 96, 96 formed in the pivot arm to connect the arm to the piston/cylinder assembly 90. As is clear from FIG. 9, by selecting the appropriate hole 96, the angular extent of the arm's travel can be adjusted within a predetermined range, and the ball joints 91 and 94 allow the arm 80 to move smoothly throughout this range.

The piston/cylinder assembly 90 is actuated by a solenoid valve 93 and driven by the air pump 59. The valve 93 is controlled by command signals provided by the controller 15, under the direction of the operator using keypad 14, to move the pivot arm between a loading position indicated at A in FIG. 9, a heating position indicated at B, and an attaching position indicated at C. A support 98 is fixed to the pivot arm 80 and includes a block holder 100 adapted to receive a finishing block, such as the finishing block 102.

The finishing block 102 comprises a solid tab or button of molded thermoplastic material having a drive end 104 and an attachment or blocking end 106. When partially melted or softened, the thermoplastic material at the blocking end 106 permits the block not only to conform to all lens curves, but also to accommodate structural discontinuities in the surface of the lens, such as the bifocal step 30 formed in the front surface 31 of the lens. The partially melted thermoplastic material not only allows the attachment end of the block to conform to the front surface of the lens, but also serves as an adhesive which bonds the finishing block 102 to the lens. The drive end 104 of the block 102 defines a pattern (not shown) which mates with the chuck on the drive of the edging device, thus allowing the blocked lens to be directly inserted onto the edging device for subsequent processing.

To attach the finishing block 102 to the front surface of the lens, the operator manually places the finishing block, attachment end up, on the support 98, with the pivot arm in the loading position at A. The operator then initiates an attachment cycle by entering the appropriate command using the keypad 14. Once the operator initiates the cycle, it is carried out automatically by the apparatus 10 under the direction of the controller 15. The controller first actuates the piston/cylinder 90 to pivot the arm 80 to the heating position at B. A heating unit 110 mounted on the frame 16 at B above the pivot arm is then activated by the controller for a predetermined period of time to partially melt or soften the upwardly facing attachment end 106 of the finishing block 102. After the time period elapses, the controller deactivates the heating unit and actuates the piston/cylinder assembly 90 to move the pivot arm to the attachment position at C.

When the pivot arm 80 is at the attachment position, the controller directs a second pneumatic piston/cylinder assembly 112 coupled to the shaft 82 and actuated by a solenoid valve 113 to raise the pivot arm from its normally lowered position shown in FIG. 1 and bring the finishing block 102 into contact with the front surface 31 of the lens 24. The controller 15 maintains the arm in its raised position for a period of time sufficient to ensure that the finishing block adheres to the lens.

It should be understood that the attachment position C is a predetermined position fixed relative to the apparatus regardless of the particular lens being blocked. This position is specified by the graphics program which generates the alignment pattern, and the pattern for each particular lens is generated relative to this fixed position. Typically, the pattern is generated with the position C indicating the geographic center of the finished lens. Thus, in the case of the lens 24, for example, when the finishing block is attached it will be located in the geographic center of the finished lens defined by the periphery markings 45. Accordingly, the apparatus 10 can be employed to automatically attach a finishing block to any lens as long as the alignment pattern displayed on the LCD for that lens is properly aligned with the reference markings on the lens.

While preferred embodiments have been shown and described, various modifications and substitutions may be made without departing from the spirit and scope of the invention. For example, apparatus using other types of imaging screens positioned at various alternative positions along the image path could be utilized. Accordingly, it is to be understood that the present invention has been described by way of example and not by limitation.

We claim:

1. A system for attaching a finishing block to a lens having a front surface, a rear surface and reference data present on one of the surfaces, said system including an apparatus comprising:

means for projecting an alignment pattern along an image path, the pattern including a computer generated tolerance box defined by optical parameters of the lens, the periphery of the box defining the allowable tolerance in the position of the optical center and prism of the lens;

a lens support for supporting the lens within the image path;

means for imaging the alignment pattern and the reference data to align the pattern with the data; and means for attaching the finishing block to the one surface of the lens in registration with the data.

2. The system of claim 1 further comprising:

a layout computer linked to the apparatus, said layout computer provided with data representing the optical parameters of the lens, said layout computer generating the tolerance box based on the parameters.

3. The system of claim 2, wherein the optical parameters of the lens include the sphere power, cylinder power, cylinder axis, prism tolerance, decentration, horizontal power, and vertical power of the lens and millimeters of prism allowed along the 90° and 180° meridian of the lens.

4. A method for attaching a finishing block to a lens having a front surface and a rear surface and reference data present on one of said surfaces, said method comprising the steps of:

calculating the allowable tolerance in the position of the optical center of the lens and the prism of the lens;

projecting an alignment pattern representing characteristics of the lens, the pattern including a computer generated tolerance box defined by optical parameters of the lens, the periphery of the box defining the allowable tolerance in the position of the optical center and prism of the lens;

imaging the alignment pattern and the reference data;

positioning the lens so that the image of the reference data aligns with the image of the alignment pattern;

determining whether the lens is within tolerance using the visual representation; and attaching the finishing block to the one surface of the lens in registration with the reference data.

5. The method of claim 4, wherein the step of projecting is further characterized in that the optical parameters defining the tolerance box include the sphere power, cylinder power, cylinder axis, prism tolerance, decentration, horizontal power, and vertical power of the lens and millimeters of prism allowed along the 90° and 180° meridian of the lens.

* * * * *